(12) United States Patent
Xu et al.

(10) Patent No.: US 12,272,974 B2
(45) Date of Patent: Apr. 8, 2025

(54) RECHARGEABLE BATTERY PACK AND HANDHELD VACUUM CLEANER

(71) Applicant: Beijing Roborock Technology Co., Ltd., Beijing (CN)

(72) Inventors: Jian Xu, Beijing (CN); Peng Lei, Beijing (CN)

(73) Assignee: Beijing Roborock Technology Co., Ltd., Beijing (CN)

( * ) Notice: Subject to any disclaimer, the term of this patent is extended or adjusted under 35 U.S.C. 154(b) by 632 days.

(21) Appl. No.: 17/623,307

(22) PCT Filed: Jun. 28, 2020

(86) PCT No.: PCT/CN2020/098610
§ 371 (c)(1),
(2) Date: Dec. 28, 2021

(87) PCT Pub. No.: WO2020/259702
PCT Pub. Date: Dec. 30, 2020

(65) Prior Publication Data
US 2022/0376538 A1 Nov. 24, 2022

(30) Foreign Application Priority Data
Jun. 28, 2019 (CN) .......................... 201920987295.4

(51) Int. Cl.
*H01M 10/46* (2006.01)
*A47L 9/28* (2006.01)
*H02J 7/00* (2006.01)

(52) U.S. Cl.
CPC ........ *H02J 7/00302* (2020.01); *A47L 9/2884* (2013.01); *H02J 7/00304* (2020.01)

(58) Field of Classification Search
CPC .............. H02J 7/00302; H02J 7/00304; H02J 7/00306; H02J 7/0031; A47L 9/2884;
(Continued)

(56) References Cited

U.S. PATENT DOCUMENTS

2010/0236807 A1 9/2010 Johnson et al.
2016/0240901 A1 8/2016 Kondo

FOREIGN PATENT DOCUMENTS

CN 101841071 A 9/2010
CN 102456914 A 5/2012
(Continued)

OTHER PUBLICATIONS

Machine translate WO2019022071A1 (Jan. 31, 2019) (Year: 2019).*
(Continued)

*Primary Examiner* — Edward Tso
(74) *Attorney, Agent, or Firm* — Morgan, Lewis & Bockius LLP

(57) ABSTRACT

The disclosure provides a rechargeable battery pack, applicable to a handheld vacuum cleaner, including: a polymer cell, comprising at least one polymer cell unit; a charger input terminal, electrically connected to the polymer cell, wherein the polymer cell is charged through the charger input terminal; a power interface, electrically connected to the polymer cell, and configured to supply power to the handheld vacuum cleaner when the rechargeable battery pack is connected to the handheld vacuum cleaner; and a protective circuit module (PCM) board. A handheld vacuum cleaner is further provided herein.

19 Claims, 5 Drawing Sheets

(58) Field of Classification Search
CPC ............. H01M 10/425; H01M 50/247; H01M 2220/30
USPC ......... 320/107, 112, 114, 116, 118, 132, 149
See application file for complete search history.

(56) References Cited

FOREIGN PATENT DOCUMENTS

| | | |
|---|---|---|
| CN | 105359328 A | 2/2016 |
| CN | 206237151 U | 6/2017 |
| CN | 104247198 B | 7/2017 |
| CN | 108091794 A | 5/2018 |
| CN | 207490058 U | 6/2018 |
| CN | 209472411 U | 10/2019 |
| CN | 210224193 U | 3/2020 |
| JP | 2005285455 A | 10/2005 |
| JP | 2011188681 A | 9/2011 |
| TW | I404291 B | 8/2013 |
| WO | 2019/022071 A1 | 1/2019 |

OTHER PUBLICATIONS

International Search Report issued in corresponding International Patent Application No. PCT/CN2020/098610 dated Sep. 17, 2020.
Extended European Search Report issued in the corresponding Application No. 20831351.0, dated Feb. 29, 2024.

* cited by examiner

RECHARGEABLE BATTERY PACK AND HANDHELD VACUUM CLEANER

CROSS-REFERENCE TO RELATED APPLICATIONS

The present application is a US national phase based on a PCT Application No. PCT/CN2020/098610, filed Jun. 28, 2020, which claims priority to Chinese Patent Application No. 201920987295.4 filed on Jun. 28, 2019, which is incorporated herein by reference in its entirety.

TECHNICAL FIELD

The present disclosure relates to a rechargeable battery pack and a handheld vacuum cleaner.

BACKGROUND

Existing wireless handheld separation devices are required to be powered by batteries, and capacity of the batteries directly affects endurance performance and user experience of the handheld separation devices.

The existing handheld separation devices typically adopt cylindrical battery cells. The cylindrical battery cells have relatively large internal resistance and generate a great amount of heat in high-power mode, which degrades user experience.

Through long-term research, the inventor of the present disclosure has gradually developed a rechargeable battery pack and a handheld vacuum cleaner to solve the foregoing technical problems.

It should be noted that the information disclosed in the BACKGROUND section is intended only to facilitate understanding of the background of the present disclosure, and therefore may include information that does not constitute the prior art known to one of ordinary skill in the art.

SUMMARY

Based on implementations of the present disclosure, according to a first aspect, embodiments of the present disclosure provide a rechargeable battery pack, applicable to a handheld vacuum cleaner, including:

a polymer cell, including at least one polymer cell unit;

a charger input terminal, electrically connected to the polymer cell, wherein the polymer cell is charged through the charger input terminal;

a power interface, electrically connected to the polymer cell and configured to supply power to the handheld vacuum cleaner when the battery pack is connected to the handheld vacuum cleaner; and a PCM board, including a power management chip and a peripheral balancing circuit connected between the polymer cell and the power management chip.

In an embodiment of the present disclosure, the polymer cell has a square structure, and includes at least two polymer cell units connected in series.

In an embodiment of the present disclosure, the power interface includes a positive electrode and a negative electrode, both of which extend upwards from a top surface of the polymer cell.

In an embodiment of the present disclosure, the rechargeable battery pack further includes: an upper bracket having a hollow structure and covering an upper portion of the polymer cell from top to bottom, and a lower bracket having a hollow structure and covering a lower portion of the polymer cell from bottom to top.

In an embodiment of the present disclosure, the upper bracket includes at least one auriform buckling portion at a lower edge thereof, and the lower bracket includes at least one concave clamping portion at an upper edge thereof, and the auriform buckling portion cooperates with the concave clamping portion for locking.

In an embodiment of the present disclosure, the rechargeable battery pack further includes a PCM board disposed on a top surface of the upper bracket, wherein the power interface is electrically connected to a surface of the PCM board, and an end of the PCM board is connected to the polymer cell via a wire.

In an embodiment of the present disclosure, the peripheral balancing circuit includes a plurality of balancing circuit units that correspond to the at least two polymer cell units in one-to-one manner; the power management chip is configured to monitor a voltage difference between the at least two polymer cell units, control a corresponding balancing circuit unit to be turned on to reduce the voltage difference upon detecting that the voltage difference exceeds a predetermined value, and control the corresponding balancing circuit unit to keep turned off upon detecting that the voltage difference is less than the predetermined value.

In an embodiment of the present disclosure, the balancing circuit unit includes: a switching element, configured to be turned on or off a corresponding balancing circuit under the control of the power management chip; a current limiting resistor, configured to limit a current passing through the switching element when the balancing circuit unit is turned on; and a low-pass filter, configured to reduce a voltage sampling noise when the power management chip monitors the voltage difference.

In an embodiment of the present disclosure, the polymer cell includes a first to N-th stage polymer cell units connected in series, the peripheral balancing circuit includes a first to N-th stage balancing circuit units, and the power management chip includes a first to N-th stage voltage sampling terminals. For an n-th stage balancing circuit unit: a control terminal of the switching element is connected to an (n+1)-th stage voltage sampling terminal of the power management chip, and is configured to be turned on upon a short circuit between an n-th stage voltage sampling terminal and the (n+1)-th stage voltage sampling terminal, or to be turned off upon disconnection between the n-th stage voltage sampling terminal and the (n+1)-th stage voltage sampling terminal; a first terminal of the switching element is connected between an anode of an n-th stage polymer cell unit and the n-th stage voltage sampling terminal via the current limiting resistor, and a second terminal of the switching element is connected to an anode of an (n+1)-th stage polymer cell unit, where N≥2, N>n≥1, and both n and N are integers.

In an embodiment of the present disclosure, the low-pass filter includes a filter resistor and a filter capacitor; and in the n-th stage balancing circuit unit: the filter resistor is connected between the first terminal of the switching element and the n-th stage voltage sampling terminal; a first terminal of the filter capacitor is connected between the filter resistor and the n-th stage voltage sampling terminal, and a second terminal of the filter capacitor is connected between the control terminal of the switching element and the (n+1)-th stage voltage sampling terminal.

In an embodiment of the present disclosure, the first to N-th stage voltage sampling terminals are respectively connected to positive electrodes of the first to N-th stage polymer cell units through a connector of the PCM board.

In an embodiment of the present disclosure, the rechargeable battery pack further includes at least one piece of buffer foam, which is disposed between the polymer cell and the upper bracket and/or between the polymer cell and the lower bracket.

In an embodiment of the present disclosure, the rechargeable battery pack further includes an adapter board electrically connected to the polymer cell;

wherein the charger input terminal is electrically connected to the adapter board, and forms a positive output port and a negative output port on a side of the PCM board; a connection terminal of the PCM board is electrically connected to the adapter board via a wire, and charging and discharging of the polymer cell are controlled by components on the PCM board.

In an embodiment of the present disclosure, the rechargeable battery pack further includes an insulating plate arranged between the charger input terminal and the adapter board.

Based on implementations of the present disclosure, according to a second aspect, the present disclosure provides a handheld vacuum cleaner, which includes the rechargeable battery pack according to any one of the foregoing aspects.

BRIEF DESCRIPTION OF DRAWINGS

To describe the technical solutions according to embodiments of the present disclosure more clearly, accompanying drawings intended for describing the embodiments are briefly introduced in the following. Clearly, the accompanying drawings in the following description illustrates merely some embodiments of the present disclosure, and one of ordinary skill in the art may derive other drawings from these accompanying drawings without any creative works.

DESCRIPTION OF EMBODIMENTS

Figure 1:
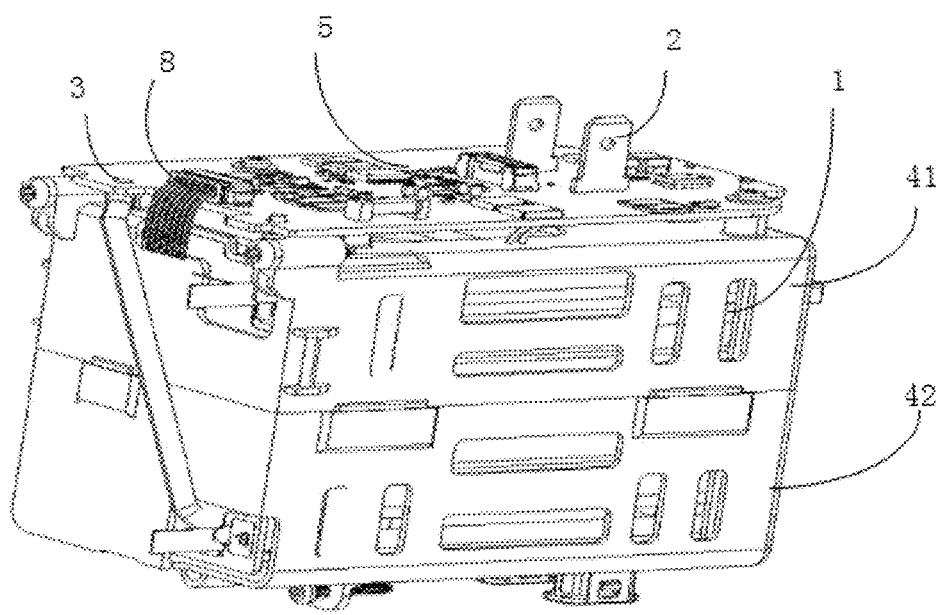
FIG. 1 illustrates an overall schematic structural view of a rechargeable battery pack according to some embodiments of the present disclosure.

To make the objectives, technical solutions, and advantages of the present disclosure clearer, the present disclosure will be described in detail hereinafter with reference to the accompanying drawings. Clearly, the described embodiments are merely some rather than all of the embodiments of the present disclosure. All other embodiments obtained by one of ordinary skill in the art based on the embodiments of the present disclosure without any creative works shall fall within the protection scope of the present disclosure.

The terms used in the embodiments of the present application are merely for the purpose of illustrating specific embodiments, and cannot be construed as a limit to the present application. The terms "a", "the", and "this" in singular forms used in the embodiments and the appended claims of the present application are also intended to include plural forms, unless specified otherwise in the context clearly. "A plurality of" typically includes at least two.

It should be understood that, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between associated objects.

Depending on the context, for example, the word "if" used herein may be explained as "when" or "upon" or "in response to determining" or "in response to detection". Similarly, depending on the context, the phrase "if determining" or "if detecting (stating a condition or an event)" may be explained as "upon determining" or "in response to determining" or "upon detecting (stating a condition or an event)" or "in response to detecting (stating a condition or an event)".

It should further be noted that, the terms "include", "comprise", or any other variant thereof are intended to cover a non-exclusive inclusion, so that a product or a system that includes a list of elements not only includes those elements but also includes other elements that are not expressly listed, or further includes elements inherent to such a product or system. An element preceded by "includes a . . . " does not, without more constraints, preclude the existence of additional identical elements in the product or system that includes the element.

The following describes preferred embodiments of the present disclosure in detail with reference to the accompanying drawings.

A rechargeable battery pack according to the present disclosure may be applicable to any electrical equipment that requires power supply, including cleaning devices such as vacuum cleaners, sweeping robots or the like. In these embodiments, a rechargeable battery pack which is applicable to a handheld vacuum cleaner is taken as an example for description. The handheld vacuum cleaner includes a vacuum cleaner with any shape and structure, but is not limited thereto.

As illustrated in FIG. 1, the rechargeable battery pack includes: a polymer cell 1, which includes at least one polymer cell unit 11; a charger input terminal 3, which is electrically connected to the polymer cell unit 11, wherein when the rechargeable battery pack is connected to the handheld vacuum cleaner or the rechargeable battery pack is removed from the handheld vacuum cleaner, the polymer cell 1 of the rechargeable battery pack is charged through the charger input terminal 3; and a power interface 2, which is electrically connected to the polymer cell unit 11, wherein when the rechargeable battery pack supplies power to the handheld vacuum cleaner when connected to the handheld vacuum cleaner.

The charger input terminal 3 is electrically connected to the polymer cell 1 via a wire. In fact, the charger input terminal forms a common channel for charging and discharging the polymer cell. When charging, a charging circuit of a PCM board charges the polymer cell through the charger input terminal. And when discharging, the polymer cell supplies power to the handheld vacuum cleaner through the charger input terminal and a discharging circuit of the PCM board, wherein the discharging circuit is connected between the charger input terminal and the power interface 2.

In the foregoing description, "when the rechargeable battery pack is connected to the handheld vacuum cleaner" means that the rechargeable battery pack is connected to the handheld vacuum cleaner through the power interface 2. An appreciating manner is that the handheld vacuum cleaner can suck dust with the foregoing connection. When the handheld vacuum cleaner is required to be charged, the polymer cell 1 can be charged through the charger input terminal 3, which may be connected to a sheet spring charging electrode that is arranged on the handheld vacuum cleaner, or which is directly connected to a charging plug electrically. "When the rechargeable battery pack is removed from the handheld vacuum cleaner" means that, a user replaces a rechargeable battery pack of low power on the handheld vacuum cleaner with a rechargeable battery pack of sufficient power so as to avoid waiting to clean until charging of the rechargeable battery pack of low power is completed, and then the rechargeable battery pack of low power can be charged through the charger input terminal 3 electrically connected to a charging plug.

In an embodiment of the present disclosure, the polymer cell 1 has a square structure. For example, the polymer cell 1 has a rectangular parallelepiped structure or a cubic structure. Alternatively, the polymer cell 1 has other structure so as to be adapted to a structure of electrical equipment.

Figure 2:
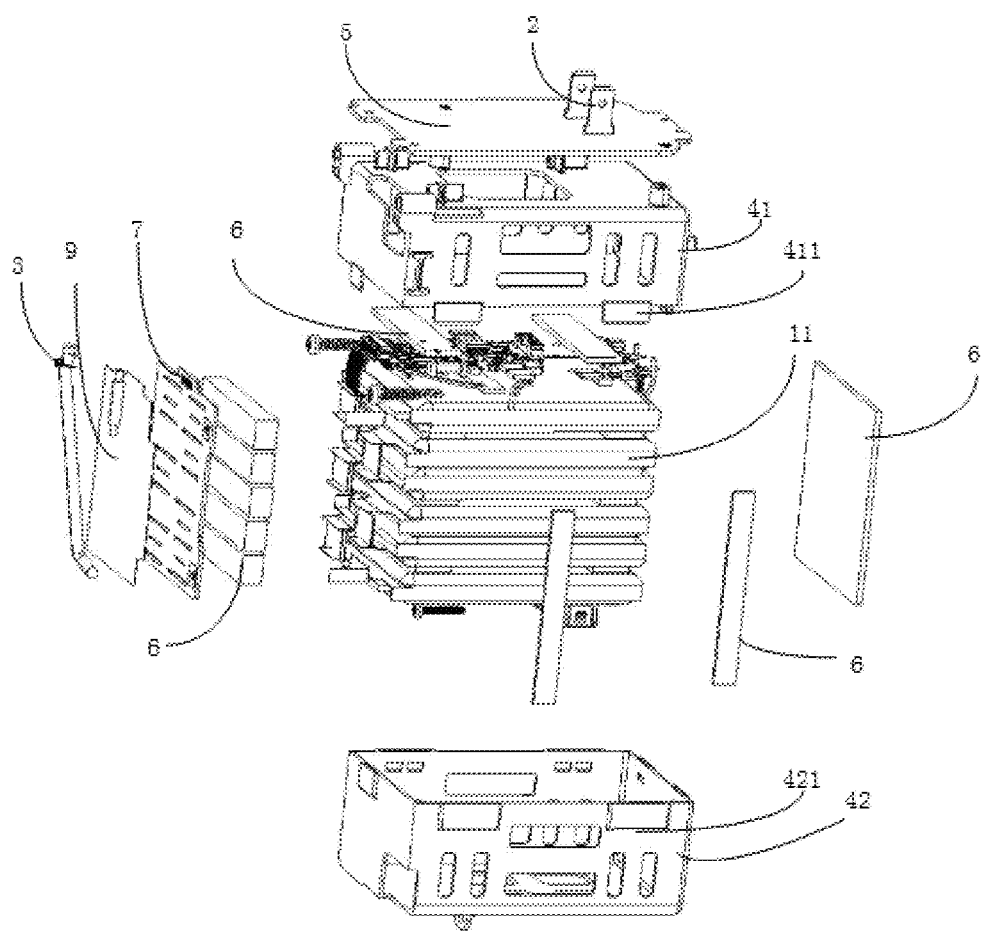
FIG. 2 illustrates an exploded schematic structural view of a rechargeable battery pack according to some embodiments of the present disclosure.

As illustrated in FIG. 2, the polymer cell 1 includes at least two polymer cell units 11 connected in series, and a series structures of more cell units may be formed based on electricity consumption. For example, 5-10 cell units 11 are connected in series. The series connection of the cell units is formed in such a way that a positive electrode of a cell unit is connected electrically to a negative electrode of another cell unit.

In an embodiment of the present disclosure, the power interface 2 includes a positive electrode sheet and a negative electrode sheet extending upwards from a top surface of the polymer cell 1. The positive and negative electrode sheets are arranged in parallel to supply power to the handheld vacuum cleaner when the polymer cell 1 is connected to the handheld vacuum cleaner. The positive and negative electrode sheets are electrically connected to the PCM board, for example, by welding, and the PCM board is connected to the polymer cell unit 11 through a wire 8, as illustrated in FIG. 2.

In an embodiment of the present disclosure, the rechargeable battery pack further includes: an upper bracket 41, having a hollow structure and covering an upper portion of the polymer cell 1 from top to bottom; and a lower bracket 42 having a hollow structure and covering a lower portion of the polymer cell 1 from bottom to top. A lower edge of the upper bracket 41 includes at least one auriform buckling portion 411, and an upper edge of the lower bracket 42 includes at least one concave clamping portion 421, and the auriform buckling portion 411 cooperates with the concave clamping portion 421 for locking, so as to form a frame structure that completely surrounds the polymer cell 1 to protect the polymer cell 1. Both the upper bracket 41 and the lower bracket 42 may be made of an insulating rigid material. Alternatively, the upper bracket 41 and the lower bracket 42 may be formed by other structural forms, and the structures of the upper bracket 41 and the lower bracket 42 are not limited as long as they together form an enclosed closed structure to protect the battery cell disposed therein from damage. The hollow structures of the upper bracket 41 and the lower bracket 42 may alternatively be set according to requirements.

In an embodiment of the present disclosure, the upper bracket 41 further includes a T-shaped separator extending upward from the top surface of the upper bracket 41, and the positive and negative electrodes are disposed on a respective side of the T-shaped separator 21, so as to avoid a short circuit during operation. The positive and negative electrodes may have a sheet shape with an elastic structure. When connected to the handheld vacuum cleaner, the positive and negative electrodes are elastically and electrically connected to terminals of the handheld vacuum cleaner to ensure reliable power supply.

In an embodiment of the present disclosure, the rechargeable battery pack further includes a protective circuit module (PCM) board 5, which is disposed on the top surface of the upper bracket 41 and electrically connected to the power interface 2 and the polymer cell 1, respectively.

The polymer cell 1 is connected to a control device of the PCM board 5 via a wire 8, and positive and negative electrodes of one or more cell units 11 of the polymer cell are connected to form a positive electrode and a negative electrode of the polymer cell on the adapter board 7. The positive electrode and the negative electrode are connected to the PCM board via a wire to form a charging-discharging circuit. The foregoing charging-discharging circuit is specifically as follows: a discharging circuit indicates a circuit that is arranged on the PCM board and that flows to the power interface 2 through the charger input terminal 3, wherein the discharging circuit supplies power of the polymer cell to the handheld vacuum cleaner through the power interface 2 for operation; while a charging circuit indicates a circuit that is arranged on the PCM board and that flows to the charger input terminal 3 through additional charging interface (not shown in the figure) disposed on the PCM board, wherein the charging circuit charges the polymer cell 1 with power input from an external power supply through the charging port.

Figure 3:
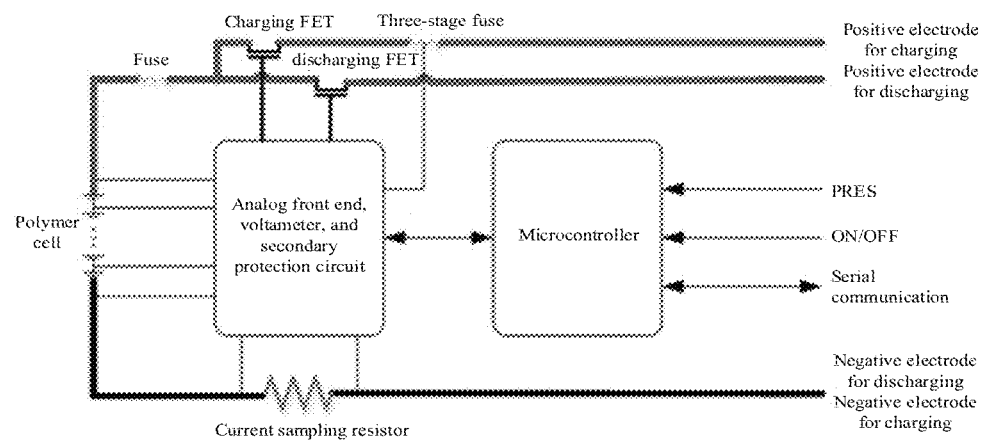
FIG. 3 illustrates a schematic diagram of a circuit structure of a rechargeable battery pack according to some embodiments of the present disclosure.

As illustrated in FIG. 3, the PCM board includes a positive charging electrode and a negative charging electrode for charging of the polymer cell and a positive discharging electrode and a negative charging electrode for discharging of the polymer cell. The PCM board has a black box function to record the number of charging cycles and charging history, including information such as maximum charging currents and discharging currents, a maximum voltage and a minimum voltage, a maximum voltage difference, and a maximum temperature and a minimum temperature of respective battery cell units, and etc.

A shutdown mode based on power, time, and PRES pin ensures static power consumption of the rechargeable battery pack and the whole machine while improving the user experience.

In an embodiment of the present disclosure, the PCM board provides battery protection functions, including overcharge protection, overdischarge protection, overtemperature protection, overcurrent protection, and short circuit protection. Upon detecting that a voltage of any battery cell units exceeds a predetermined value (for example, 4.2 V) or a voltage of any battery cell units is less than a predetermined value (for example, 3.0 V), the system automatically cuts off the charging circuit or the discharging circuit. If a temperature of any of the battery cell units exceeds its operating temperature, or a current of any of the battery cell units is greater than its discharging current, the system automatically cuts off the current path to ensure safety of the rechargeable battery pack and the system.

In an embodiment of the present disclosure, the PCM board further provides power balancing. The entire rechargeable battery pack comprises a plurality of battery cell units in series. After a specific period of operation, due to inconsistency of the battery cell units, inconsistency of the operating temperatures, etc., a great difference may be exhibited finally, which has huge impact on a service life of the battery and use of the system. Power balancing is to make up for the difference between individual battery cell units by performing some active or passive charging or discharging management, so as to ensure battery consistency and prolong the service life of the battery. Typically, power balancing includes two types: passive power balancing and active power balancing. Passive power balancing is to achieve balancing by consuming the power of the battery with more power through a resistor. Active power balancing is to achieve balancing by transferring the power of the battery with more power to the battery with less power through a capacitor, an inductor, or a transformer. For circuits and processing examples of power balancing, please refer to detailed description in connection with FIG. 4.

Figure 4:
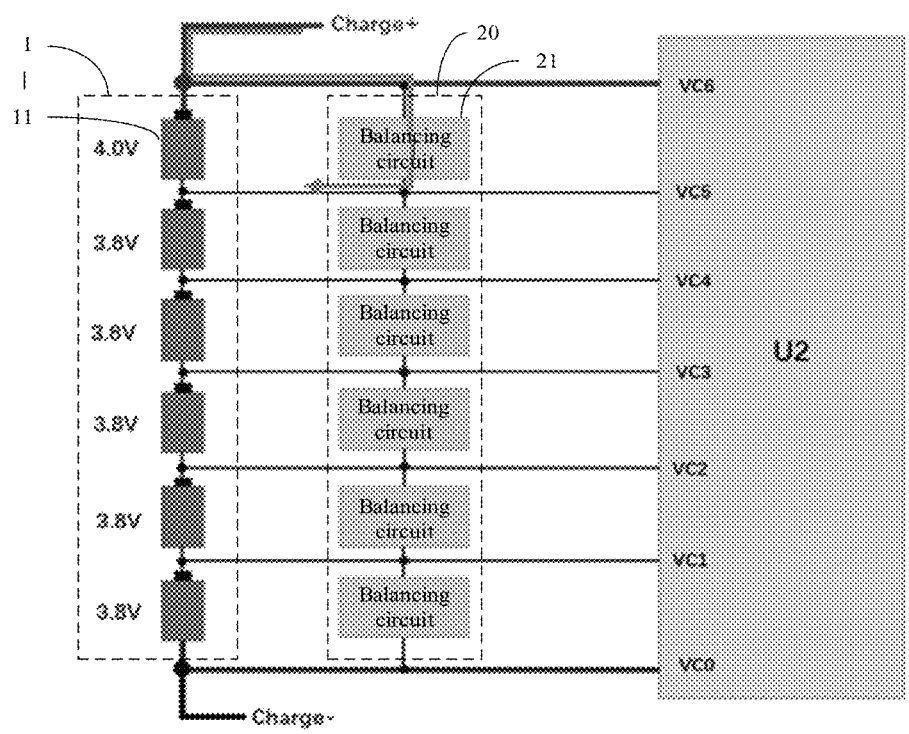
FIG. 4 illustrates a schematic diagram of a PCM circuit of a rechargeable battery pack according to some embodiments of the present disclosure.

FIG. 4 illustrates a schematic diagram of achieving power balancing through a PCM circuit of a rechargeable battery pack according to some embodiments of the present disclosure. As illustrated in FIG. 4, the PCM board includes a power management chip U2 and a peripheral balancing circuit 20 connected between the polymer cell 1 and the power management chip U2. The polymer cell 1 includes a plurality of polymer cell units 11 (six polymer cell units 11, illustrated in FIG. 4 as an example). The peripheral balancing circuit 20 includes a plurality of balancing circuit units 21 that correspond to the plurality of polymer cell units 11 respectively. The power management chip U2 is configured to monitor a voltage difference between the plurality of polymer cell units 11, and upon detecting that the voltage difference exceeds a predetermined value, control a corresponding balancing circuit unit 21 to be turned on to reduce the voltage difference, and upon detecting that the voltage difference is less than the predetermined value, control the corresponding balancing circuit unit 21 to keep turned off. As illustrated in FIG. 4, it is assumed that when a voltage sampling terminal VC6 of the power management chip U2 detects that a voltage (for example, 4.0 V) of a first stage polymer cell unit is significantly greater than that of another polymer cell unit, a corresponding balancing circuit unit 21 is controlled to be turned on, so that a charging current between charging terminals charge+ and charge– do not passes through the first stage polymer cell unit any longer, and flows through the balancing circuit unit 21 (as indicated by the arrow in FIG. 4). When a voltage of another polymer cell unit is charged to a specific level (for example, 4.0 V), and the voltage sampling terminal VC6 of the power management chip U2 detects that the voltage of the first stage polymer cell unit is not significantly greater than that of the another polymer cell unit any longer, the corresponding balancing circuit unit 21 is controlled to be turned off, so that the charging current can pass through the first stage polymer cell unit again. In this way, power balancing can be achieved among a multi-stage polymer cell units.

Figure 5:
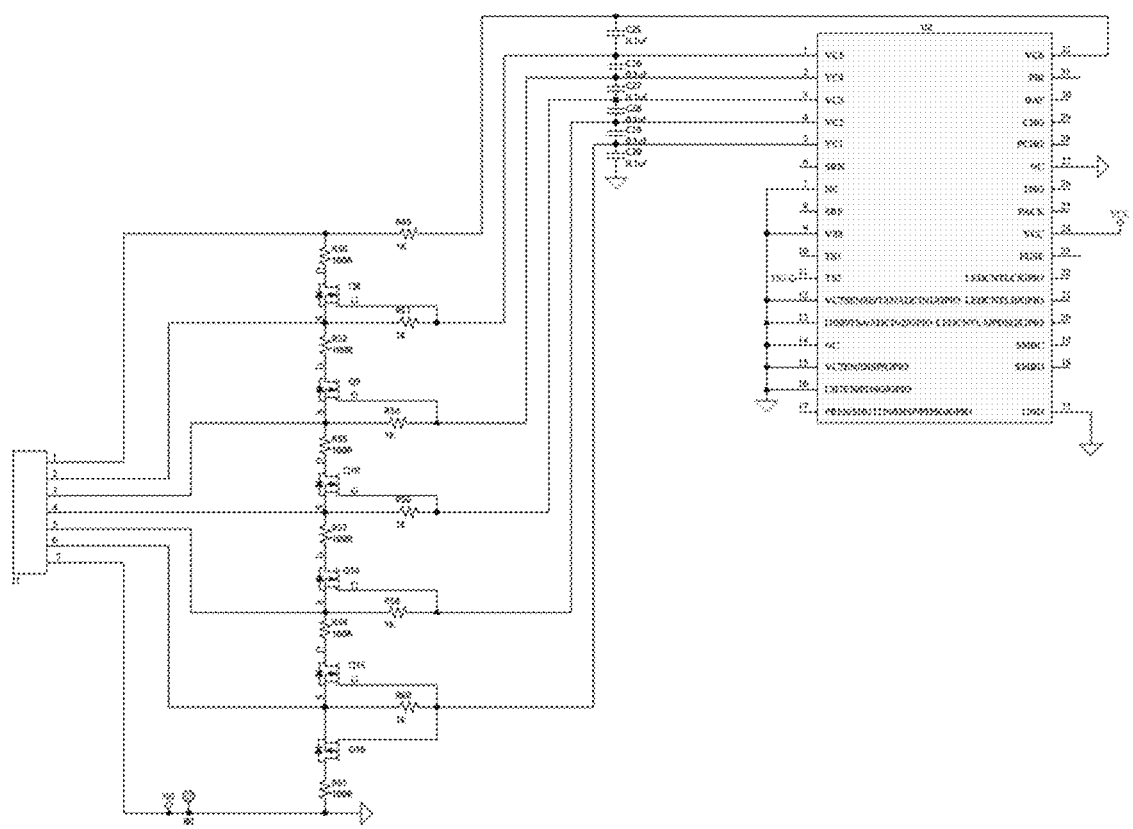
FIG. 5 illustrates a schematic diagram of a PCM circuit of a rechargeable battery pack according to some embodiments of the present disclosure.

FIG. 5 illustrates a schematic diagram of a PCM circuit of a rechargeable battery pack according to some embodiments of the present disclosure. In the figure, an example in which the PCM board is connected to six battery cell units is taken for illustration, but the present disclosure does not limit the number of battery cell units. As illustrated in FIG. 5, J1 is a connector on the PCM board for connecting six battery cell units, and J1 is connected to the adapter board 7 via a wire 8; U2 is a battery management IC, and VC1, VC2, VC3, VC4, VC5, and VC6 are respectively connected to positive electrodes of the six battery cell units via a peripheral balancing circuit; Q8, Q9, Q10, Q14, Q15 and Q16 are configured to turn ON/OFF the peripheral balancing circuit 20; R50, R52, R55, R57, R59 and R61 are configured to limit a current after the balancing circuit is turned ON; R49 and C25 form a low-pass filter to reduce noise of a VC6 voltage sampling channel; similarly, the other five combinations of resistors and capacitors play the same role.

Upon detecting that a voltage difference between the cell units exceeds a specific value, U2 turns on the balancing circuit to consume an excessive cell unit voltage, so that a voltage difference of each cell unit meets a specified value. Exemplarily, if a voltage of a cell unit 1 connected to PIN 1 and PIN 2 of J1 is greater than voltages of the other five cells and exceeds a threshold Uth for U2 to turn on the balancing circuit, VC6 and VC5 of U2 are internally short-circuited to turn on the peripheral balancing, and after the short circuit, Q8 is turned on, the cell unit 1 forms a current circuit with R150 and Q8, and the voltage gradually decreases. When U2 detects that the voltage of the cell unit 1 is balanced and a voltage difference between the cell unit 1 and other cell units is less than a specific value, VC6 and VC5 are internally disconnected, Q8 is turned off, and the balancing circuit is turned off at the same time.

The peripheral balancing circuit based on the foregoing embodiments can solve the problem in the related technology that an internal balancing circuit of the chip is used, and consequently a great amount of heat is generated within the chip and an internal balancing speed is relatively low.

In an embodiment of the present disclosure, the PCM is also a voltammeter, which can obtain an accurate remaining battery life at any time. Remaining battery life can be determined based on the voltage of the battery, and alternatively, the remaining battery life can be obtained according to a current integration method, as well as an internal resistance method, a neural network method, a Kalman filter method, and etc.

In an embodiment of the present disclosure, the PCM includes an external communication interface, which can provide warning information and battery status at any time. Mainstream communication interfaces include SPI, I2C, CAN, RS485, and etc.

In a case of single battery pack, the PRES pin is invalid, the PCM is always in a shutdown mode, and the static power consumption is less than 20 µA. To prevent overdischarge of a single battery during storage, after assembly of an entire machine, automatic shutdown based on time can avoid overdischarge in the storage state of the entire machine.

When a finished product is in operation under normal power, if no charging or discharging is performed, the product is in sleep mode to shorten discharging time. When the remaining battery life is lower than a specific threshold, the product shuts down to avoid overdischarge.

Based on the remaining battery life obtained by the PCM and with reference to determination of whether the battery pack is connected to the handheld vacuum cleaner, embodiments of the present disclosure further provide a policy of quickly starting a handheld vacuum cleaner, which is described in detail as follows.

In some embodiments of the present disclosure, when the rechargeable battery pack is not connected to the handheld vacuum cleaner, a battery management system (BMS) is in a lowest power consumption state to achieve lowest standby power consumption of a single battery pack. For example, a battery management IC is in shutdown mode, and a microcontroller unit (MCU) is in stop mode.

Then, after the rechargeable battery pack is connected to the handheld vacuum cleaner, to achieve an effect of quickly starting the handheld vacuum cleaner, the battery management IC is in sleep mode, the MCU is in stop mode, and a discharge field effect transistor (which is a MOS transistor) is always on. In static state, the battery management IC in sleep mode periodically monitors a voltage and a temperature of a cell unit. If no abnormality, the discharge MOS remains on. If any abnormality, the discharge MOS is turned off. This solution can save time for the battery management IC to detect the voltage, the temperature, etc. of the battery at every power-on, thereby achieving the effect of quickly starting the handheld vacuum cleaner.

In some other embodiments, when the battery pack is discharged to reach a first threshold (for example, 2.9 V) or stored to reach a second threshold (for example, 3.3 V), the battery management IC switches to the shutdown mode, and the MCU is in stop mode, so as to achieve the lowest standby power consumption, and prevent the battery cell from quickly consuming power to permanent failure.

In some other embodiments, the PCM in the embodiments of the present disclosure can further provide a recharging function, which is described in detail as follows. The handheld vacuum cleaner is provided with a charging rack. Considering that the user may place the handheld vacuum cleaner on the rack for charging after use, after the handheld vacuum cleaner is fully charged, a battery protection board disconnects the charger from the battery cell to stop charging. However, if the user has not used the machine for a long time, self-consumption of the battery reduces a battery capacity to a low value, and the battery life may be affected when the user uses the handheld vacuum cleaner again in this case.

An example of the battery recharging function in the embodiments of the present disclosure is as follows. After the battery is fully charged, the charging stops. At the same time, the battery MCU starts a timer to detect current remaining battery life resulting from self-consumption of the battery once every time interval (such as two weeks). If the remaining battery life is found to be less than a specified value (such as 93%) or the minimum voltage of a single cell unit is less than a specified value (for example 4.08 V), the recharging function is enabled to charge the battery to a fully charged state.

The design of the foregoing recharging function can not only avoid a user experience problem that a short battery life is caused by using the handheld vacuum cleaner after a long-term storage, but also avoid battery safety accidents caused by frequent charging or continuous charging after full charge.

In an embodiment of the present disclosure, the rechargeable battery pack according to the embodiments of the present disclosure further includes at least one piece of buffer foam 6, which is disposed between the polymer cell 1 and the upper bracket 41 and/or between the polymer cell 1 and the lower bracket 42. As illustrated in FIG. 2, the piece of buffer foam 6 may include a plurality of strip-like structures, which are respectively disposed on the upper and lower surfaces of the polymer cell 1 and around the polymer cell 1, to form a buffer between the polymer cell 1 and the rigid bracket, so as to protect the polymer cell 1 in a case of collision or fall.

In an embodiment of the present disclosure, the rechargeable battery pack according to the embodiments of the present disclosure further includes an adapter board 7, which electrically connects the polymer cell 1 to the PCM board 5, and is configured to transfer the power of the polymer cell to the power interface, and to charge the polymer cell through a charging port disposed on the PCM board or at any other position. The power interface 2 is connected to the adapter board 7 via a wire arranged along a specific path, and forms a positive output terminal and a negative output terminal, both of which are disposed on the upper portion of the rechargeable battery pack. The polymer cell includes a positive discharging terminal and a negative discharging terminal, both of which are welded to the adapter board 7 through conductive materials (such as nickel, copper and other good conductive metals). The wires connect the positive and negative charging terminals and the positive and negative discharging terminals of the polymer cell that are connected to the adapter board to the PCM board. The power interface 2 formed of a nickel sheet extends outwards from the PCM board. The charger input terminal 3 is disposed on an edge of the PCM board at a same side as the adapter board 7 or a different side from the adapter board 7, to facilitate charging and discharging of the rechargeable battery pack.

In other words, on one hand, the PCM board 5 is electrically connected to the adapter board 7 through the connection terminal J1 on the PCM board 5 and the wire 8, and the components on the PCM board are configured to control charging and discharging of each cell unit of the polymer cell 1. On the other hand, an electrical connection port of the PCM board 5 is connected to the adapter board 7 through a wire (not shown) to achieve the charging and the discharging of the polymer cell.

An insulating plate 9 is arranged between the wire and the adapter board 7 to prevent short circuit between the adapter board 7 and the wire.

For example, parameters of the rechargeable battery pack according to the present disclosure are illustrated in the following table.

| Item | Spec | design parameters for ATL/NVT |
|---|---|---|
| Charging voltage | 25.2 | 25.2 V (6S1P) |
| Nominal voltage | 22.2 V | 22.2 V |
| Capacity | 3610 mAh (min)/80 Wh (min) | 3610 mAh (min)/80 Wh (min) |
| Maximum charging temperature | 0° C. to 15° C. | 0.5 $C_{min}$ Max to 4.2 V, then CV to 0.02 $C_{min}$ |
| | 15° C. to 45° C. | 1.0 $C_{min}$ Max to 4.2 V, then CV to 0.02 $C_{min}$ |
| Maximum charging power | 450 W (max) | 450 W (max) |
| Maximum charging current | 26 A (max) | 26 A (max) |
| $1^{st}/2^{nd}$ protection function | $1^{st} + 2^{nd}$ 4.30V | $1^{st}$ protection: BQ40Z80 $2^{nd}$ protection: BQ771800 |
| Impedance | ≤65 mΩ | 50% charge, AC 1 K Hz test at 25° C. ± 5° C., cell >= 3.65 V |

Parameters designed for a single cell unit are illustrated in the following table.

| | |
|---|---|
| Charging cut-off voltage | 4.2 V |
| Nominal voltage | 3.7 V |
| Discharging cut-off voltage | 2.8 V |
| Nominal capacity | 3700 mA |

| | |
|---|---|
| Minimum capacity | 3610 mA |
| Charging conditions | Temperature: −20° C. to 45° C. |
| | Humidity: <75% RH |
| Weight | 53.2 g |

According to the rechargeable battery pack and the device in the present disclosure, the polymer cell of the rechargeable battery pack has smaller internal resistance than a cylindrical cell typically used in a handheld vacuum cleaners and electric tool products, so that the polymer cell generates less heat in a case of large-current discharging, and therefore has high market value.

Embodiments of the present disclosure further provide a handheld vacuum cleaner, including the rechargeable battery pack according to any one of the foregoing aspects. A structure, a parameter, performance, and an effect of the rechargeable battery pack can be referred to Embodiment 1, and will not be elaborated here for simplicity.

In addition to the rechargeable battery pack, the handheld vacuum cleaner further includes conventional structures, such as an air inlet, an air outlet, a bristle brush, a fan, a dust bag, a motor, etc. These structures may be any common components of a vacuum cleaner, which are not elaborated here for simplicity.

The handheld vacuum cleaner includes a battery unit that can accommodate the rechargeable battery pack. When the handheld vacuum cleaner is in use, the rechargeable battery pack is put into the battery unit, and the rechargeable battery pack discharges through a discharging terminal. When it is required to be charged, the rechargeable battery pack may be removed for charging.

The previously described apparatus embodiments are merely illustrative. The units described as separate parts may or may not be physically separate, and parts displayed as units may or may not be physical units, may be located at a place, or may be distributed over a plurality of network units. Some or all of the modules may be selected according to actual requirements to achieve the objectives of the solutions of the embodiments.

Finally, it should be noted that the foregoing embodiments are merely intended to describe the technical solutions according to the present disclosure and cannot be construed as a limit to the present disclosure. Although the present disclosure is described in detail with reference to the foregoing embodiments, one of ordinary skill in the art should understand that he may still make modifications to the technical solutions described in the foregoing embodiments or make equivalent replacements to some technical features thereof, without departing from the spirit and scope of the technical solutions in the embodiments of the present disclosure.

What is claimed is:

1. A rechargeable battery pack, comprising:
    a polymer cell, comprising at least one polymer cell unit;
    a charger input terminal, electrically connected to the polymer cell, wherein the polymer cell is charged through the charger input terminal;
    a power interface, electrically connected to the polymer cell, and configured to supply power to the handheld vacuum cleaner when the rechargeable battery pack is connected to a handheld vacuum cleaner; and
    a protective circuit module (PCM) board, wherein the PCM board comprises a power management chip and a peripheral balancing circuit connected between the polymer cell and the power management chip,
    wherein the polymer cell comprises at least two polymer cell units connected in series;
    the peripheral balancing circuit comprises a plurality of balancing circuit units that correspond to the at least two polymer cell units in one-to-one manner; and
    the power management chip is configured to: monitor a voltage difference between the at least two polymer cell units, control a corresponding balancing circuit unit to be turned on to reduce the voltage difference upon detecting that the voltage difference exceeds a predetermined value; and control the corresponding balancing circuit unit to keep turned off upon detecting that the voltage difference is less than the predetermined value.

2. The rechargeable battery pack according to claim 1, wherein
    the polymer cell has a square structure.

3. The rechargeable battery pack according to claim 1, wherein the power interface comprises a positive electrode and a negative electrode, both of which extend upwards from a top surface of the polymer cell.

4. The rechargeable battery pack according to claim 3, further comprising:
    an upper bracket, having a hollow structure and covering an upper part of the polymer cell from top to bottom; and
    a lower bracket, having a hollow structure and covering a lower part of the polymer cell from bottom to top.

5. The rechargeable battery pack according to claim 4, wherein the upper bracket comprises at least one auriform buckling portion at a lower edge thereof, the lower bracket comprises at least one concave clamping portion at an upper edge thereof, and the auricular buckling portion cooperates with the concave clamping portion for locking.

6. The rechargeable battery pack according to claim 4, wherein the PCM board is disposed on a top surface of the upper bracket, the power interface is electrically connected to a surface of the PCM board, and an end of the PCM board is connected to the polymer cell via a wire.

7. The rechargeable battery pack according to claim 4, further comprising:
    at least one piece of buffer foam, disposed between the polymer cell and the upper bracket and/or between the polymer cell and the lower bracket.

8. The rechargeable battery pack according to claim 4, wherein the peripheral balancing circuit comprises a plurality of balancing circuit units that correspond to the at least two polymer cell units in one-to-one manner; and
    the power management chip is configured to: monitor a voltage difference between the at least two polymer cell units, control a corresponding balancing circuit unit to be turned on to reduce the voltage difference upon detecting that the voltage difference exceeds a predetermined value; and control the corresponding balancing circuit unit to keep turned off upon detecting that the voltage difference is less than the predetermined value.

9. The rechargeable battery pack according to claim 8, wherein each of the plurality of balancing circuit units comprises:
    a switching element, configured to be turned on or off the balancing circuit unit under control of the power management chip;
    a current limiting resistor, configured to limit a current passing through the switching element when the balancing circuit unit is turned on; and a low-pass filter, configured to reduce voltage sampling noise when the power management chip monitors the voltage difference.

10. The rechargeable battery pack according to claim 9, wherein the polymer cell comprises first to N-th stage polymer cell units connected in series, the peripheral balancing circuit comprises first to N-th stage balancing circuit units, and the power management chip comprises first to N-th stage voltage sampling terminals;

in an n-th stage balancing circuit unit:
a control terminal of the switching element is connected to an (n+1)-th stage voltage sampling terminal of the power management chip, and is configured to be turned on in response to a short circuit between an n-th stage voltage sampling terminal and the (n+1)-th stage voltage sampling terminal, and to be turned off in response to disconnection between the n-th stage voltage sampling terminal and the (n+1)-th stage voltage sampling terminal;
a first terminal of the switching element is connected between an anode of an n-th stage polymer cell unit and the n-th stage voltage sampling terminal via the current limiting resistor, and a second terminal of the switching element is connected to an anode of an (n+1)-th stage polymer cell unit;
wherein N≥2, N>n≥1, and both n and N are integers.

11. The rechargeable battery pack according to claim 10, wherein the low-pass filter comprises a filter resistor and a filter capacitor; and in the n-th stage balancing circuit unit:
the filter resistor is connected between the first terminal of the switching element and the n-th stage voltage sampling terminal;
a terminal of the filter capacitor is connected between the filter resistor and the n-th stage voltage sampling terminal, and the other terminal of the filter capacitor is connected between the control terminal of the switching element and the (n+1)-th stage voltage sampling terminal.

12. The rechargeable battery pack according to claim 1, wherein each of the plurality of balancing circuit units comprises:
a switching element, configured to be turned on or off the balancing circuit unit under control of the power management chip;
a current limiting resistor, configured to limit a current passing through the switching element when the balancing circuit unit is turned on; and
a low-pass filter, configured to reduce voltage sampling noise when the power management chip monitors the voltage difference.

13. The rechargeable battery pack according to claim 8, wherein the polymer cell comprises first to N-th stage polymer cell units connected in series, the peripheral balancing circuit comprises first to N-th stage balancing circuit units, and the power management chip comprises first to N-th stage voltage sampling terminals;

in an n-th stage balancing circuit unit:
a control terminal of the switching element is connected to an (n+1)-th stage voltage sampling terminal of the power management chip, and is configured to be turned on in response to a short circuit between an n-th stage voltage sampling terminal and the (n+1)-th stage voltage sampling terminal, and to be turned off in response to disconnection between the n-th stage voltage sampling terminal and the (n+1)-th stage voltage sampling terminal;
a first terminal of the switching element is connected between an anode of an n-th stage polymer cell unit and the n-th stage voltage sampling terminal via the current limiting resistor, and a second terminal of the switching element is connected to an anode of an (n+1)-th stage polymer cell unit;
wherein N≥2, N>n≥1, and both n and N are integers.

14. The rechargeable battery pack according to claim 13, wherein the low-pass filter comprises a filter resistor and a filter capacitor; and in the n-th stage balancing circuit unit:
the filter resistor is connected between the first terminal of the switching element and the n-th stage voltage sampling terminal;
a terminal of the filter capacitor is connected between the filter resistor and the n-th stage voltage sampling terminal, and the other terminal of the filter capacitor is connected between the control terminal of the switching element and the (n+1)-th stage voltage sampling terminal.

15. The rechargeable battery pack according to claim 13, wherein the first to N-th stage voltage sampling terminals are connected to a respective positive electrode of the first to N-th stage polymer cell units via a connector of the PCM board.

16. The rechargeable battery pack according to claim 1, further comprising
an adapter board, electrically connected to the polymer cell; wherein
the charger input terminal is electrically connected to the adapter board, and forms a positive input/output port and a negative input/output port on a side of the PCM board; a connection terminal of the PCM board is electrically connected to the adapter board via a wire, and components on the PCM board are configured to control charging and discharging of the polymer cell.

17. The rechargeable battery pack according to claim 16, further comprising:
an insulating plate, arranged between the charger input terminal and the adapter board.

18. The rechargeable battery pack according to claim 1, wherein the rechargeable battery is rechargeable through the charger input terminal when the rechargeable battery pack is connected to the handheld vacuum cleaner or the battery pack is removed from the handheld vacuum cleaner.

19. A handheld vacuum cleaner, comprising the rechargeable battery pack according to claim 1.

* * * * *